United States Patent [19]

Recenello

[11] 4,298,991
[45] Nov. 10, 1981

[54] PERIPHERAL VIEW BLINDERS

[76] Inventor: Angelo Recenello, 817 Carmel Ave., Albany, Calif. 94706

[21] Appl. No.: 172,927

[22] Filed: Jul. 28, 1980

[51] Int. Cl.³ .............................................. A61F 9/02
[52] U.S. Cl. ........................................... 2/13; 2/451; 351/47
[58] Field of Search ..................... 2/13, 451, 449, 453; 351/47, 44, 48, 49

[56] References Cited
U.S. PATENT DOCUMENTS 2,724,834  11/1955  Henderson et al. ..................... 2/13
2,858,539  11/1958  Carlson ..................................... 2/13
3,226,729  1/1966   Fucci ...................................... 2/13X
4,105,304  8/1978   Baker ..................................... 351/47

Primary Examiner—Peter P. Nerbun

[57] ABSTRACT

Disclosed is apparatus to limit the peripheral vision of the user. A pair of shields are pivotally attached to the templepieces of a pair of eyeglasses or an eyeglass-like frame. The pivotal movement is arrested by an inwardly extending pivot stop located near the upper edge of the shield. The pivot stop halts the pivotal movement of the shield in two positions to either block the peripheral vision or leave it unobstructed.

1 Claim, 3 Drawing Figures

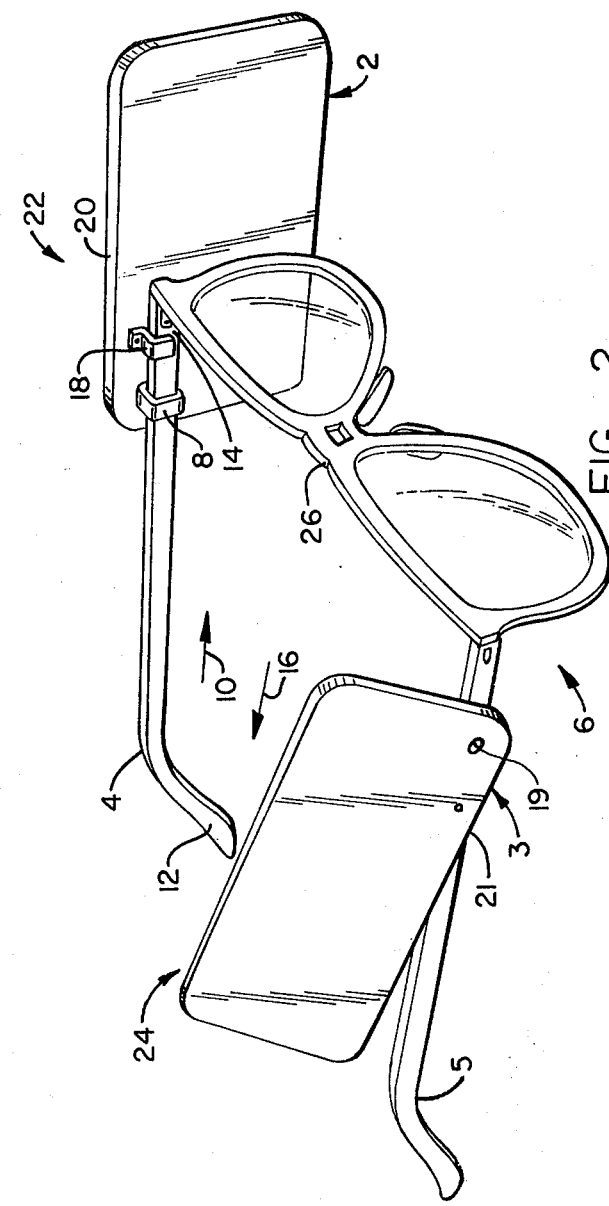
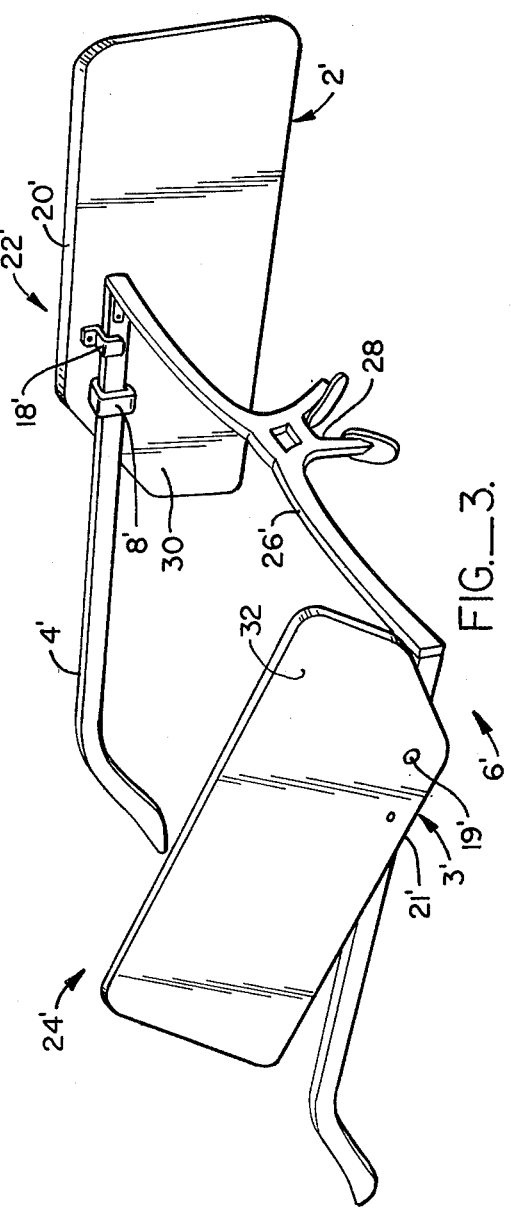
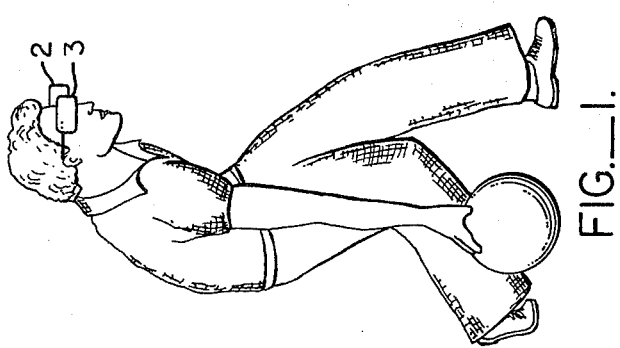

PERIPHERAL VIEW BLINDERS

BACKGROUND

Concentration and control are key factors in successful bowling. Modern bowling alleys are typically quite large and have a great number of lanes adjacent to each other. Many bowlers find that the actions of persons in adjacent lanes to be quite distracting to their game.

Various types of eye shades and protective shields are known in the prior art. See for example, U.S. Pat. Nos. 3,721,490; 3,932,031 and 4,105,304. These prior art devices, however, are not suitable for reducing the problems caused by peripheral vision. First, they all clip on to the templepiece of the eyeglass frame and thus require the user to wear eyeglasses. Second, and most significantly, the prior art devices do not provide the user with two positions of use, that is, one position wherein the peripheral vision is substantially blocked and the other wherein the peripheral vision is unimpeded. Thus, a means to reduce peripheral distractions, but which is be easily and and quickly retracted to allow the person a normal field of vision when needed, has not been available.

SUMMARY OF THE INVENTION

The present invention is directed to and solves the problems of the prior art by providing peripheral view shields pivotally attached to each templepiece of an eyeglass-like frame. A pivot stop on each shield allows the shield to be pivoted into a first or forward position to block the peripheral view of the user and into a second or rearward position which leaves the peripheral view of the user substantially unimpeded or restored.

The disclosed invention may be practiced by two basic embodiments. The first embodiment is used by persons who normally wear eyeglasses and includes a pair of shields pivotally clipped to the templepieces of the eyeglasses. The clip allows the shield to pivot in a vertical plane generally parallel to the templepiece. The pivotal movement is arrested by the inwardly extending pivot stop.

The pivot clip and pivot stop are located near the upper edge of the typically rectangular shield. When the shield is in a first or forward position, the pivot stop engages the templepiece near where the templepiece is attached to the lens frame. In this first shield position the shield extends substantially below the templepiece centrally of the lens frame so that approximately half of the shield extends in front of the lens frame and approximately half of the shield extends to the rear of the lens frame. The peripheral view of the user becomes effectively blocked.

When the shield is pivoted in the opposite direction to a second or rearward position, the pivot stop halts the movement of the shield so that substantially all of the shield is above the templepiece and behind the lens frame. Thus, the user can easily and quickly either block his peripheral vision or leave it unobstructed as desired. In a second embodiment, primarily used for persons who do not wear eyeglasses, an eyeglass-like frame (without lenses) is used in lieu of eyeglasses for supporting the pivotally mounted shields.

The shields thus provide the user with maximum obstruction of peripheral view when desired. When unobstructed peripheral view is desired, the user can quickly and easily rotate the shields out of the way. The pivot stop halts the rotation of the shield at the desired position. Thus, the user, such as a bowler, can block his peripheral view while actually bowling but can restore his peripheral view at other times.

The shields are pivotally positioned to extend both in front of and to the rear of the lens frame when in a forward position. This provides the maximum peripheral obstruction. By positioning the pivot stop and pivot clip near the upper edge of the shield, when in the rearward position substantially all of the shield is above the templepiece and to the rear of the lens frame. This provides virtually no obstruction to peripheral view.

Other features and advantages of the present invention will appear from the following description of the preferred embodiment which has been set forth in detail in conjunction with the accompanying drawings.

BRIEF DESCRIPTION OF THE DRAWINGS

FIG. 1 shows a bowler using the peripheral view blinders of the present invention.

FIG. 2 is a perspective view of the blinders attached to the templepieces of a pair of eyeglasses.

FIG. 3 is a perspective view of an alternative preferred embodiment of the blinders pivotally mounted to templepieces of an eyeglass-like frame by use by a person not wearing eyeglasses.

DETAILED DESCRIPTION OF THE PREFERRED EMBODIMENT

Generally, as shown in the Figures, the peripheral view blinders of the present invention include a pair of shields 2, 3, each shield pivotally mounted to templepieces 4, 5 of a frame 6 via a pivot clip 8.

Throughout this application the terms forward will be used to mean in the direction of arrow 10, or from distal end 12 of templepiece 4 towards connecting end 14 of temple piece 4. Rearward will mean in the direction of arrow 16 of FIG. 2. The embodiment of FIG. 2 will be discussed first with the embodiment of FIG. 3 discussed thereafter. Finally, the use of the invention will be described.

Turning to FIG. 2, the blinders of the present invention include a pair of shields 2, 3 attached via pivot clips 8 to templepieces 4, 5. Frame 6 is a standard pair of eyeglasses to which the user clips the shields. Each shield has a pivot stop 18 mounted near the upper edge 20, 21 of shields 2, 3. Pivot clips 8 are likewise located near edges 20, 21 and the shields are hinged thereto by a pin 19.

Shield 2 is shown in a first or forward position 22 while shield 3 is shown in the second or rearward position 24. In first position 22 pivot stop 18 is forward of pivot clip 8 and allows shield 2 to extend forward of the connecting lens frame portion 26 of frame 6. The shields are preferably attached along the templepieces so that approximately half of the shield extends forward of the connecting lens frame portion when in the first or forward position.

The pivot clips and pivot stops are attached to the shields relatively close to the upper edges of the shields so that when the shield is in its second or rearward position 24, substantially all of the shield is above the templepiece and to the rear of frame 26. This positioning of the pivot clip and pivot stop allows the user to pivot or turn the shields about mounting pin 19 to the first or forward position thus substantially obstructing the peripheral view of the user; the positioning also allows the user to easily remove the peripheral obstruction by pivoting the shields back to the second or rearward positions.

At FIG. 3, an embodiment of the present invention is shown particularly adapted for persons who do not wear glasses. Primed numbers refer to like elements of the embodiment of FIG. 2. Eyeglass-like frame 6' is essentially a pair of eyeglasses having the lenses removed and the connecting lens frame portion 26' severed immediately below the nose bridge portion 28. In this embodiment pivot clip 8' may be permanently mounted to the templepiece 4' if desired. However, it is preferred that the user be able to move clip 8' along the templepiece to suit the user's preference.

Shields 2', 3' are shown having a somewhat different shape from the shields of FIG. 2. Shields 2', 3' are still relatively rectangular in shape but have tapered sections 30, 32 extending rearward when shield 2' is in the first or forward position 22'. By beveling the top edges 20', 21' of shields 2', 3' in the area of sections 30, 32, the pivot clip may be placed further forward and yet insure that a peripheral view of the user is substantially unimpeded when the shields are in the second or rearward position 24'. This is illustrated by shield 3' in FIG. 3.

Although the use of the blinders of the present invention should now be apparent, their use will be briefly described. Assuming that the user wears eyeglasses, the user attaches shields 2, 3 to templepieces 4, 5 on the frame 6 of his eyeglasses. The shields are then positioned along the templepieces while in the first or forward position so that the shield extends to the desired distance forward of lens frame 26. The user then places the eyeglasses on with the blinders attached thereto. The shields are rotated to a rearward position so that the peripheral view is unobstructed. When it is desired to block the peripheral vision, typically just after retrieving a bowling ball from the ball return, the user rotates the shields to the first or forward position where the pivot stops halt the pivotal movement of the shields at the appropriate point. The user then bowls undistracted by movements which would otherwise intrude upon the bowler's concentration. See FIG. 1.

In this application reference has been made to the user as a bowler. However, it is to be understood that the blinders of the present invention are also suited for other activities when it desired to restrict the peripheral vision of the user and is not to be limited to the sport of bowling only.

Pivotal movement is halted via the pivot stops. Although the use of the pivot stops is inexpensive and reliable, other means for halting the pivotal movement, such as incorporating detent positions in the pivot clip, could likewise be used. Further modifications and variations can be made from the preferred embodiment without departing from what is regarded as the invention as defined in the claims below.

I claim:

1. Blinders for obstructing a user's peripheral vision comprising:

first and second elongate templepieces, each having forward and rearward ends;

a templepiece connecting member, said member having means for resting its central portion on the bridge of the user's nose;

means for foldably connecting the forward ends of each templepiece to opposite ends of said connecting member;

first and second generally planar, substantially opaque shields each having an upper edge;

first and second means for pivotally connecting said first and second shields near the upper edges thereof to said first and second templepieces, said pivotally connecting means being adapted to permit each said shield to pivot in generally vertical planes parallel to said respective templepiece; and first and second pivot stops mounted to said respective first and second shields near the respective upper edges, said pivot stops extending toward the respective templepiece for engagement therewith to halt the pivotal movement of said respective shield in a first shield position when said shield is rotated in a first direction and in a second shield position when said shield is rotated in the direction opposite the first direction, each said shield positioned generally centrally of said templepiece connecting member and substantially below the respective templepieces when in said first shield position and positioned substantially rearward of said connecting member and substantially above the respective templepieces when in said second shield position;

whereby the peripheral vision of the user is substantially obstructed when the shields are in their respective first shield positions and is substantially unobstructed when in the second shield position.

* * * * *